US011962711B2

United States Patent
Seol et al.

(10) Patent No.: US 11,962,711 B2
(45) Date of Patent: Apr. 16, 2024

(54) ELECTRONIC DEVICE INCLUDING ANTENNA AND STYLUS PEN

(71) Applicant: Samsung Electronics Co., Ltd., Suwon-si (KR)

(72) Inventors: Kyungmoon Seol, Suwon-si (KR); Hyeonuk Kang, Suwon-si (KR); Jinkyu Bang, Suwon-si (KR); Jinwoo Jung, Suwon-si (KR); Donguk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 17/535,140

(22) Filed: Nov. 24, 2021

(65) Prior Publication Data

US 2022/0150336 A1     May 12, 2022

Related U.S. Application Data

(63) Continuation of application No. PCT/KR2021/015820, filed on Nov. 3, 2021.

(30) Foreign Application Priority Data

Nov. 10, 2020    (KR) ................. 10-2020-0149707
Jan. 15, 2021    (KR) ................. 10-2021-0005842

(51) Int. Cl.
    *H04M 1/02*      (2006.01)
    *G06F 1/16*       (2006.01)
    (Continued)

(52) U.S. Cl.
    CPC .......... *H04M 1/026* (2013.01); *G06F 1/1607* (2013.01); *G06F 3/03545* (2013.01);
    (Continued)

(58) Field of Classification Search
    CPC .. H04M 1/026; H04M 1/233; H04M 2201/08; H04M 1/0256; H04M 1/02;
    (Continued)

(56) References Cited

U.S. PATENT DOCUMENTS 6,262,684 B1 *   7/2001   Stewart .................. H01Q 1/244
                                                     343/900
9,195,351 B1 *   11/2015   Rosenberg ............ G06F 1/1626
    (Continued)

FOREIGN PATENT DOCUMENTS

JP        2017-069867 A     4/2017
KR    10-2008-0092224 A    10/2008
    (Continued)

OTHER PUBLICATIONS

International Search Report with Written Opinion dated Feb. 11, 2022, issued in International Patent Application No. PCT/KR2021/015820.

*Primary Examiner* — Andrew Wendell
(74) *Attorney, Agent, or Firm* — Jefferson IP Law, LLP

(57) ABSTRACT

An electronic device including an antenna and a stylus pen, that can reduce antenna performance degradation, is provided. The electronic device includes a housing including a conductive part and at least one cut-off portion formed in the conductive part, a printed circuit board disposed inside the housing, a wireless communication interface disposed on the printed circuit board, and a stylus pen, wherein the conductive part may be electrically connected to the wireless communication interface, wherein the stylus pen may include at least one cut-off portion, and at least one magnet enabling attachment and detachment to and from the housing, and wherein when the stylus pen is attached to the (Continued)

housing, the at least one cut-off portion formed in the conductive part and the at least one cut-off portion formed in the stylus pen are aligned.

20 Claims, 12 Drawing Sheets

(51) Int. Cl.
*G06F 3/0354* (2013.01)
*H01Q 1/24* (2006.01)
*H04B 1/03* (2006.01)
*H04B 1/08* (2006.01)
*H04M 1/23* (2006.01)

(52) U.S. Cl.
CPC ............ *H01Q 1/243* (2013.01); *H04M 1/233* (2013.01); *G06F 2200/1632* (2013.01); *H04M 2201/08* (2013.01)

(58) Field of Classification Search
CPC ............... G06F 1/1607; G06F 3/03545; G06F 2200/1632; G06F 1/1632; G06F 3/016; H01Q 1/243; H01Q 21/28; H04B 1/03; H04B 1/08
See application file for complete search history.

(56) References Cited

U.S. PATENT DOCUMENTS

| | | | |
|---|---|---|---|
| 10,091,338 B2* | 10/2018 | Amit | H04M 1/026 |
| 11,126,280 B2* | 9/2021 | Bakema | G06F 3/038 |
| 2017/0097698 A1* | 4/2017 | Maeshima | G06F 3/03545 |
| 2017/0117623 A1 | 4/2017 | Chan et al. | |
| 2017/0300138 A1* | 10/2017 | Qian | G06F 3/0446 |
| 2017/0346164 A1 | 11/2017 | Kim et al. | |
| 2018/0217687 A1 | 8/2018 | Yoo et al. | |
| 2019/0058244 A1* | 2/2019 | Kim | H01Q 1/243 |
| 2019/0179433 A1* | 6/2019 | Kim | G06F 3/03545 |
| 2019/0252766 A1* | 8/2019 | Jeon | H04M 1/0262 |
| 2019/0278390 A1* | 9/2019 | Chiang | G06F 1/1607 |
| 2020/0167012 A1 | 5/2020 | Jung et al. | |
| 2020/0310564 A1* | 10/2020 | Woo | G06F 3/046 |
| 2021/0219437 A1 | 7/2021 | Kim et al. | |
| 2021/0384754 A1* | 12/2021 | Xu | H01F 7/0247 |
| 2022/0115768 A1 | 4/2022 | Oh et al. | |

FOREIGN PATENT DOCUMENTS

| | | |
|---|---|---|
| KR | 10-2017-0019084 A | 2/2017 |
| KR | 10-2017-0133952 A | 12/2017 |
| KR | 10-2019-0143029 A | 12/2019 |
| KR | 10-2020-0059923 A | 5/2020 |
| KR | 10-2119809 B1 | 6/2020 |
| KR | 10-2020-0100986 A | 8/2020 |

* cited by examiner

ELECTRONIC DEVICE INCLUDING ANTENNA AND STYLUS PEN

CROSS-REFERENCE TO RELATED APPLICATION(S)

This application is a continuation application, claiming priority under § 365(c), of an International application No. PCT/KR2021/015820, filed on Nov. 3, 2021, which is based on and claims the benefit of a Korean patent application number 10-2020-0149707, filed on Nov. 10, 2020, in the Korean Intellectual Property Office, and of a Korean patent application number 10-2021-0005842, filed on Jan. 15, 2021, in the Korean Intellectual Property Office, the disclosure of each of which is incorporated by reference herein in its entirety.

TECHNICAL FIELD

The disclosure relates to an electronic device including an antenna and a stylus pen.

BACKGROUND ART

The use of electronic devices such as bar type, foldable type, or rollable type smartphones and tablet personal computers (PCs) is increasing, and electronic devices are provided with various functions.

Such an electronic device may transmit and receive a phone call and various data to and from another electronic device through wireless communication.

The electronic device may include at least one antenna to perform wireless communication with another electronic device.

The electronic device may detachably include a stylus pen for entering letters or pictures on the display.

The above information is presented as background information only to assist with an understanding of the disclosure. No determination has been made, and no assertion is made, as to whether any of the above might be applicable as prior art with regard to the disclosure.

DISCLOSURE

Technical Problem

At least a portion of the housing constituting the external appearance of an electronic device may include a conductive material (e.g., metal).

The at least a portion of the housing including a conductive material may be used as an antenna radiator for performing wireless communication. For example, the housing may be separated through at least one cut-off portion (e.g., slit) and may be used as plural antennas.

A stylus pen (e.g., electronic pen) capable of entering letters or pictures into the electronic device may be mounted in an internal space of the electronic device or may be detachably coupled to the outside of the electronic device.

For example, when the stylus pen including a conductive material (e.g., metal case or metal component) is in contact with or in proximity to the antenna formed in the housing of the electronic device, interference may be caused between the antenna and the stylus pen, and radiation performance of the antenna may be deteriorated.

When the radiation performance of the antenna is deteriorated, the electronic device may be unable to normally perform a phone call and/or data transmission/reception with another electronic device.

Aspects of the disclosure are to address at least the above-mentioned problems and/or disadvantages and to provide at least the advantages described below. Accordingly, an aspect of the disclosure is to provide an electronic device capable of preventing antenna performance degradation by forming a cut-off portion in the stylus pen at an aligned position corresponding to that of the cut-off portion formed in the housing (e.g., conductive part) of the electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a conductive part and at least one cut-off portion formed in the conductive part, a printed circuit board disposed inside the housing, a wireless communication module disposed on the printed circuit board, and a stylus pen, wherein the conductive part may be electrically connected to the wireless communication module, wherein the stylus pen may include at least one cut-off portion, and at least one magnet enabling attachment and detachment to and from the housing, and wherein when the stylus pen is attached to the housing, the at least one cut-off portion formed in the conductive part and the at least one cut-off portion formed in the stylus pen are aligned.

In accordance with another aspect of the disclosure, an electronic device including a stylus pen is provided. The electronic device includes a housing including a conductive part and at least one cut-off portion formed in the conductive part, a printed circuit board disposed inside the housing, a wireless communication module disposed on the printed circuit board and electrically connected to the conductive part, and at least one magnet disposed on the inward side of the conductive part, wherein the stylus pen may include at least one magnet attachable and detachable to and from the at least one magnet disposed on the inward side of the conductive part, and at least one cut-off portion formed at a position corresponding to the at least one cut-off portion formed in the conductive part, wherein when the electronic device and the stylus pen are attached, the at least one cut-off portion formed in the conductive part and the at least one cut-off portion formed in the stylus pen may be aligned.

In accordance with another aspect of the disclosure, a stylus pen is provided. The stylus pen includes a first body, a second body, a third body, and/or a fourth body, at least one cut-off portion formed between the first body and the second body, between the second body and the third body, or between the third body and the fourth body, a non-conductive member filled in the at least one cut-off portion, and at least one magnet disposed inside the first body, the second body, the third body, and/or the fourth body.

Advantageous Effects

According to various embodiments of the disclosure, a cut-off portion of the stylus pen is formed at a position corresponding to the cut-off portion formed on at least one surface of the housing (e.g., conductive part) of the electronic device, when the electronic device and the stylus pen are in contact with or adjacent to each other, the cut-off portion of the housing (e.g., conductive part) and the cut-off portion of the stylus pen are forced to be aligned, thereby reducing antenna performance degradation.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces FIG. 1 is a block diagram illustrating an electronic device in a network environment according to an embodiment of the disclosure.

Figure 1:
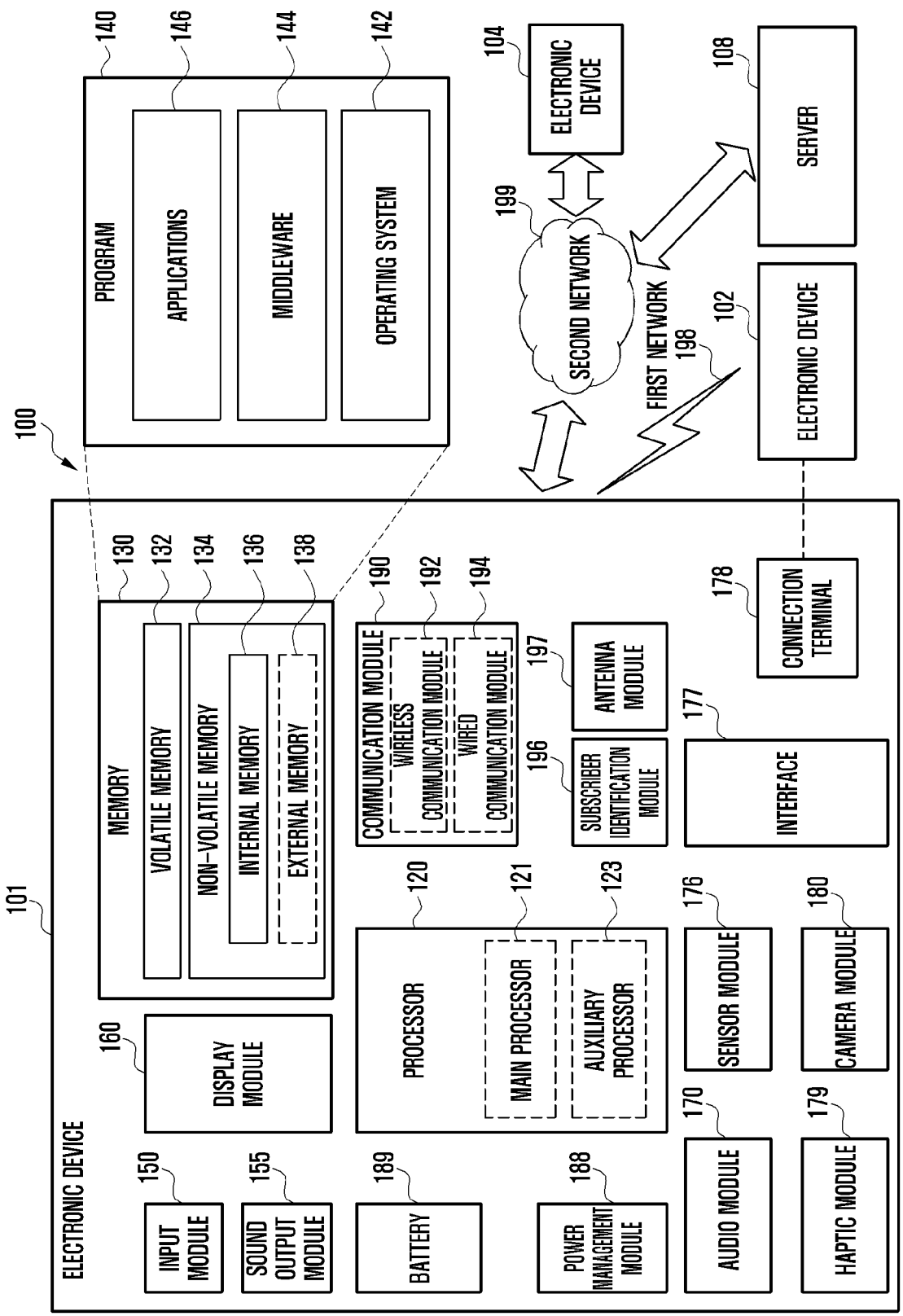
FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The non-volatile memory 134 may include an internal memory 136 and an external memory 138. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a fifth generation (5G) network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
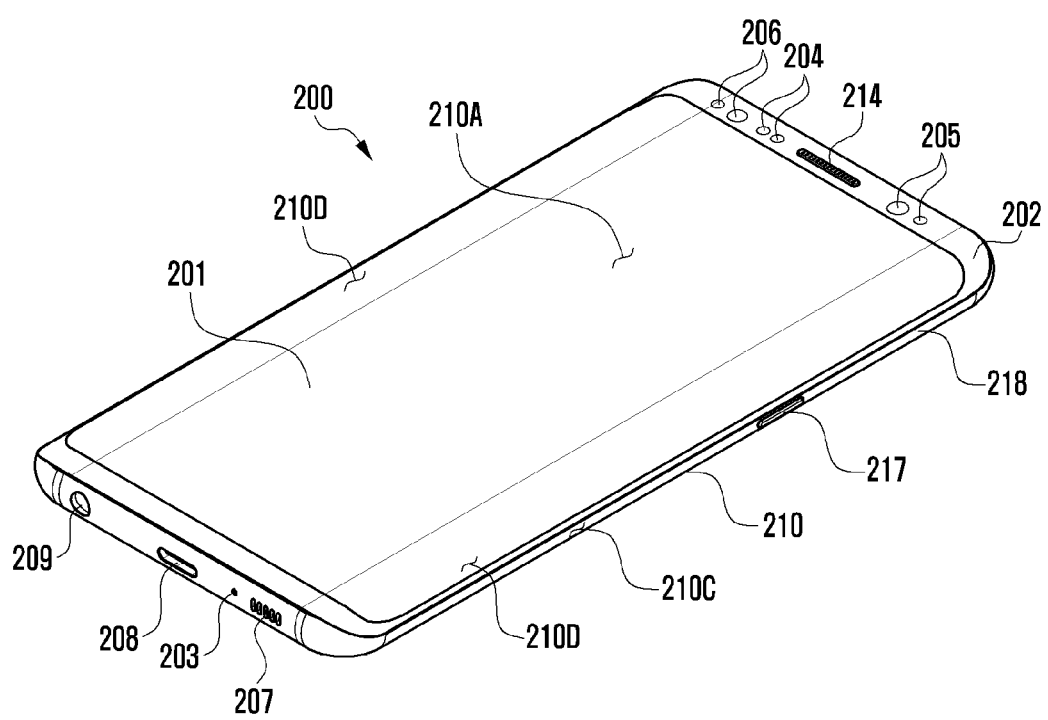
FIG. 2A is a front perspective view of an electronic device according to an embodiment of the disclosure.

FIG. 2A is a front perspective view of an electronic device according to an embodiment of the disclosure.

Figure 2B:
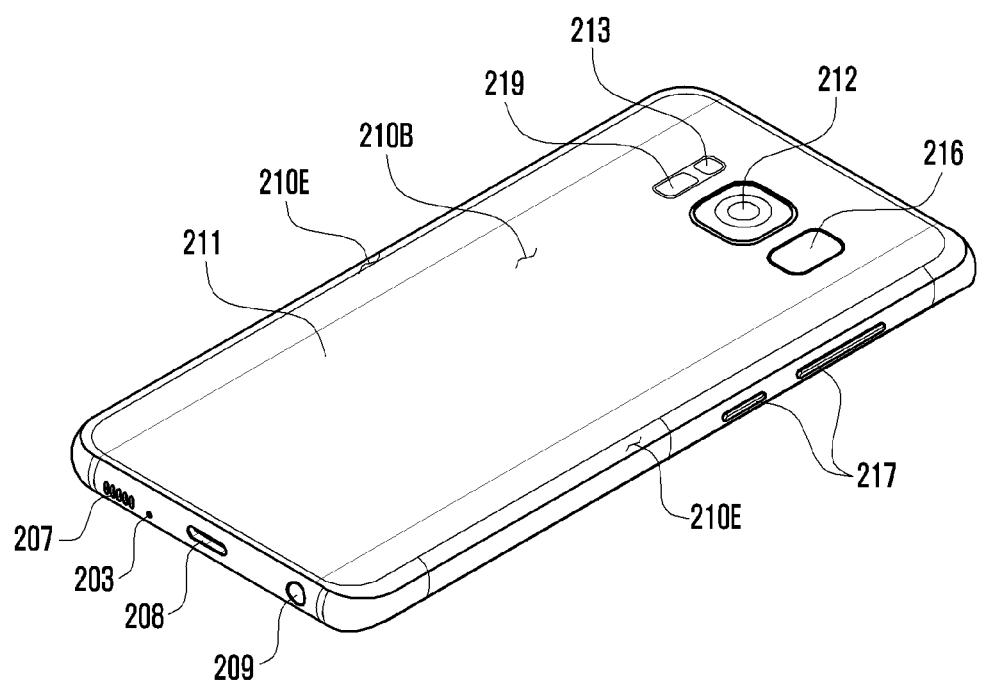
FIG. 2B is a rear perspective view of the electronic device in FIG. 2A according to an embodiment of the disclosure.

FIG. 2B is a rear perspective view of the electronic device in FIG. 2A according to an embodiment of the disclosure.

Referring to FIGS. 2A and 2B, an electronic device 200 according to an embodiment may include a housing 210 including a first surface (or front surface) 210A, a second surface (or rear surface) 210B, and a side surface 210C surrounding the space between the first surface 210A and the second surface 210B. In another embodiment (not illustrated), the housing may denote a structure that forms a part of the first surface 210A, the second surface 210B, and the side surface 210C illustrated in FIGS. 2A and 2B. According to an embodiment, the first surface 210A may be formed by a front plate 202, at least a part of which is substantially transparent (for example, a glass plate including various coating layers, or a polymer plate). The second surface 210B may be formed by a rear plate 211 that is substantially opaque. The rear plate 211 may be made of coated or colored glass, ceramic, polymer, metal (for example, aluminum, stainless steel (STS), or magnesium), or a combination of at least two of the above-mentioned materials. The side surface 210C may be formed by a side bezel structure (or "side member") 218 which is coupled to the front plate 202 and to the rear plate 211, and which includes metal and/or polymer. In some embodiments, the rear plate 211 and the side bezel structure 218 may be formed integrally and may include the same material (for example, a metal material such as aluminum).

In the illustrated embodiment, the front plate 202 may include two first areas 210D on both ends of the long edge of the front plate 202 such that the two first areas 210D bend from the first surface 210A toward the rear plate 211 and extend seamlessly. In the illustrated embodiment (see FIG. 2B), the rear plate 211 may include two second areas 210E on both ends of the long edge such that the two second areas 210E bend from the second surface 210B toward the front plate 202 and extend seamlessly. In some embodiments, the front plate 202 (or the rear plate 211) may include only one of the first areas 210D (or the second areas 210E). In another embodiment, a part of the first areas 210D or the second areas 210E may not be included. In the above embodiments, when seen from the side surface of the electronic device 200, the side bezel structure 218 may have a first thickness (or width) on a part of the side surface, which does not include the first areas 210D or the second areas 210E as described above, and may have a second thickness that is smaller than the first thickness on a part of the side surface, which includes the first areas 210D or the second areas 210E.

According to an embodiment, the electronic device 200 may include at least one of a display 201, audio modules, sensor modules 204, 216, and 219, camera modules 205, 212, and 313, a key input device 217, a light-emitting element 206, and connector holes 208 and 209. In some embodiments, at least one of the constituent elements (for example, the key input device 217 or the light-emitting element 206) of the electronic device 200 may be omitted, or the electronic device 200 may additionally include another constituent element.

The display 201 may be exposed through a corresponding part of the front plate 202, for example. In some embodiments, at least a part of the display 201 may be exposed through the front plate 202 that forms the first areas 210D of the side surface 210C and the first surface 210A. In some embodiments, the display 201 may have a corner formed in substantially the same shape as that of the adjacent outer periphery of the front plate 202. In another embodiment (not illustrated), in order to increase the area of exposure of the display 201, the interval between the outer periphery of the display 201 and the outer periphery of the front plate 202 may be formed to be substantially identical.

In another embodiment (not illustrated), a recess or an opening may be formed in a part of the screen display area of the display 201, and at least one of an audio module 214, a sensor module 204, a camera module 205, and a light-emitting element 206 may be included and aligned with the recess or the opening. In another embodiment (not illustrated), on the back surface of the screen display area of the display 201, at least one of an audio module 214, a sensor module 204, a camera module 205, a fingerprint sensor (i.e., sensor module 216), and a light-emitting element 206 may be included. In another embodiment (not illustrated), the display 201 may be coupled to or arranged adjacent to a touch sensing circuit, a pressure sensor capable of measuring the intensity (pressure) of a touch, and/or a digitizer that detects a magnetic field-type stylus pen. In some embodiments, at least a part of the sensor modules 204 and 219 and/or at least a part of the key input device 217 may be arranged in the first areas 210D and/or the second areas 210E.

The audio modules may include a microphone hole 203 and speaker holes 207 and 214. A microphone for acquiring an external sound may be arranged in the microphone hole 203, and a plurality of microphones may be arranged therein such that the direction of a sound can be sensed in some embodiments. The speaker holes 207 and 214 may include an outer speaker hole 207 and a speech receiver hole 214. In some embodiments, the speaker holes 207 and 214 and the microphone hole 203 may be implemented as a single hole, or a speaker may be included (for example, a piezoelectric speaker) without the speaker holes 207 and 214.

The sensor modules 204, 216, and 219 may generate an electric signal or a data value corresponding to the internal operating condition of the electronic device 200 or the external environment condition thereof. The sensor modules 204, 216, and 219 may include, for example, a first sensor module 204 (for example, a proximity sensor) arranged on the first surface 210A of the housing 210, and/or a second sensor module (not illustrated) (for example, a fingerprint sensor), and/or a third sensor module 219 (for example, an HRM sensor) arranged on the second surface 210B of the housing 210, and/or a fourth sensor module 216 (for example, a fingerprint sensor). The fingerprint sensor may be arranged not only on the first surface 210A (for example, the display 201) of the housing 210, but also on the second surface 210B thereof. The electronic device 200 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 204.

The camera modules 205, 212, and 213 may include a first camera module 205 arranged on the first surface 210A of the electronic device 200, a second camera device 212 arranged on the second surface 210B thereof, and/or a flash 213. The camera modules 205 and 212 may include a single lens or a plurality of lenses, an image sensor, and/or an image signal processor. The flash 213 may include, for example, a light-emitting diode or a xenon lamp. In some embodiments, two or more lenses (an infrared camera, a wide-angle lens, and a telephoto lens) and image sensors may be arranged on a single surface of the electronic device 200.

The key input device 217 may be arranged on the side surface 210C of the housing 210. In another embodiment, the electronic device 200 may not include a part of the above-mentioned key input device 217 or the entire key input device 217, and the key input device 217 (not included) may be implemented in another type, such as a soft key, on the display 201. In some embodiments, the key input device may include a sensor module 216 arranged on the second surface 210B of the housing 210.

The light-emitting element 206 may be arranged on the first surface 210A of the housing 210, for example. The light-emitting element 206 may provide information regarding the condition of the electronic device 200 in a light type, for example. In another embodiment, the light-emitting element 206 may provide a light source that interworks with operation of the camera module 205, for example. The light-emitting element 206 may include, for example, a light-emitting diode (LED), an IR LED, and a xenon lamp.

The connector holes 208 and 209 may include a first connector hole 208 capable of containing a connector (for example, a USB connector) for transmitting/receiving power and/or data to/from an external electronic device, and/or a second connector hole (for example, an earphone jack) 209 capable of containing a connector for transmitting/receiving an audio signal to/from the external electronic device.

Figure 3:
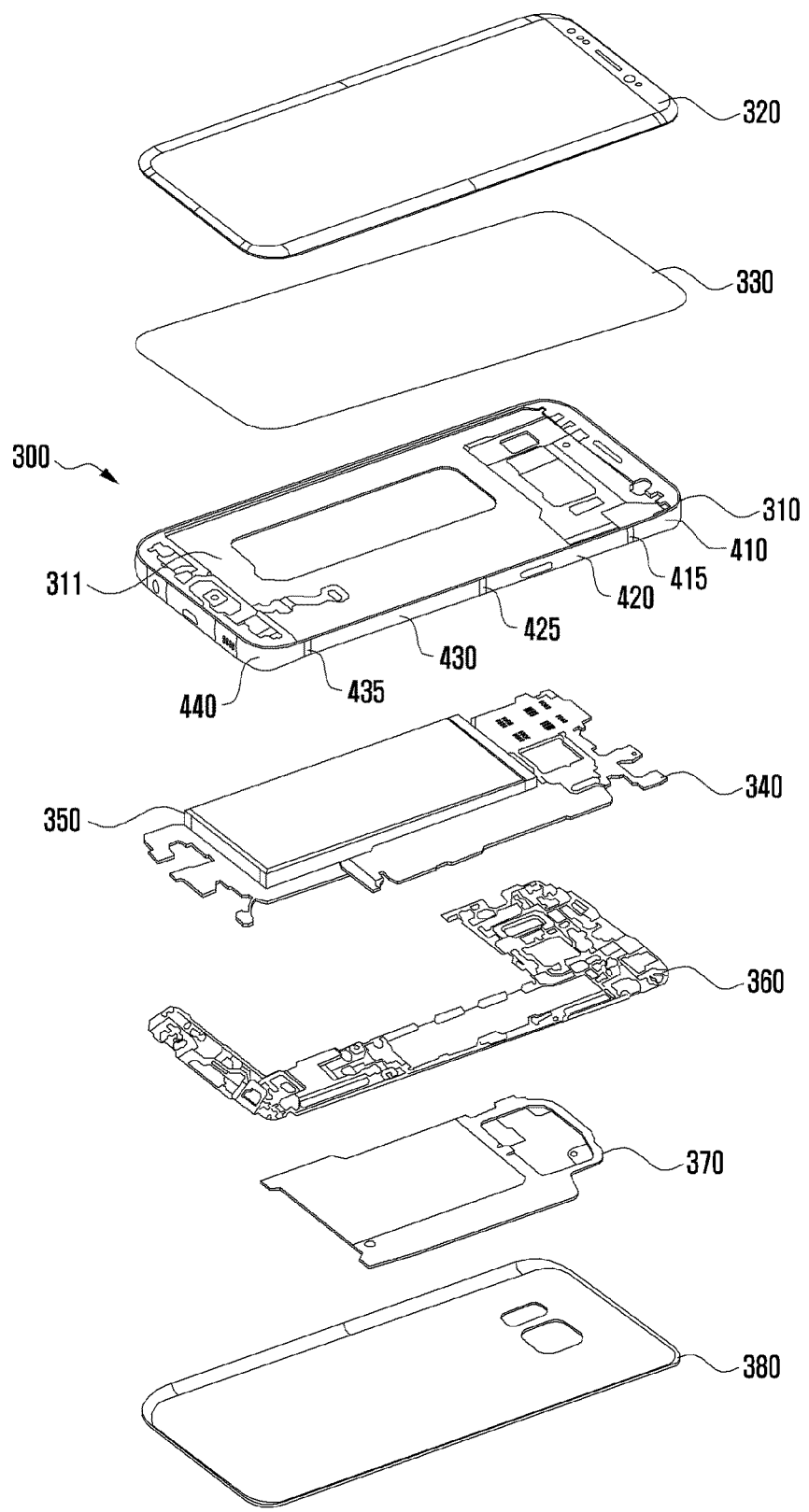
FIG. 3 is an exploded perspective view of an electronic device according to an embodiment of the disclosure.

FIG. 3 is an exploded perspective view of an electronic device according to an embodiment of the disclosure.

Referring to FIG. 3, an electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 101 or 200 of FIG. 1 to FIG. 2B, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 311.

According to various embodiments, some of the side bezel structure 310 (e.g., housing 210 in FIG. 2A) may include at least one antenna radiator (e.g., 410, 420, 430 and/or 440) formed by at least one cut-off portion (e.g., 415, 425 and/or 435). The at least one antenna radiator (e.g., 410, 420, 430 and/or 440) may be electrically or operably connected to the wireless communication module (e.g., wireless communication module 192 in FIG. 1) disposed on the printed circuit board 340 and may perform an antenna function. The at least one antenna radiator (e.g., 410, 420, 430 and/or 440) may be configured as a conductive part.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 4:
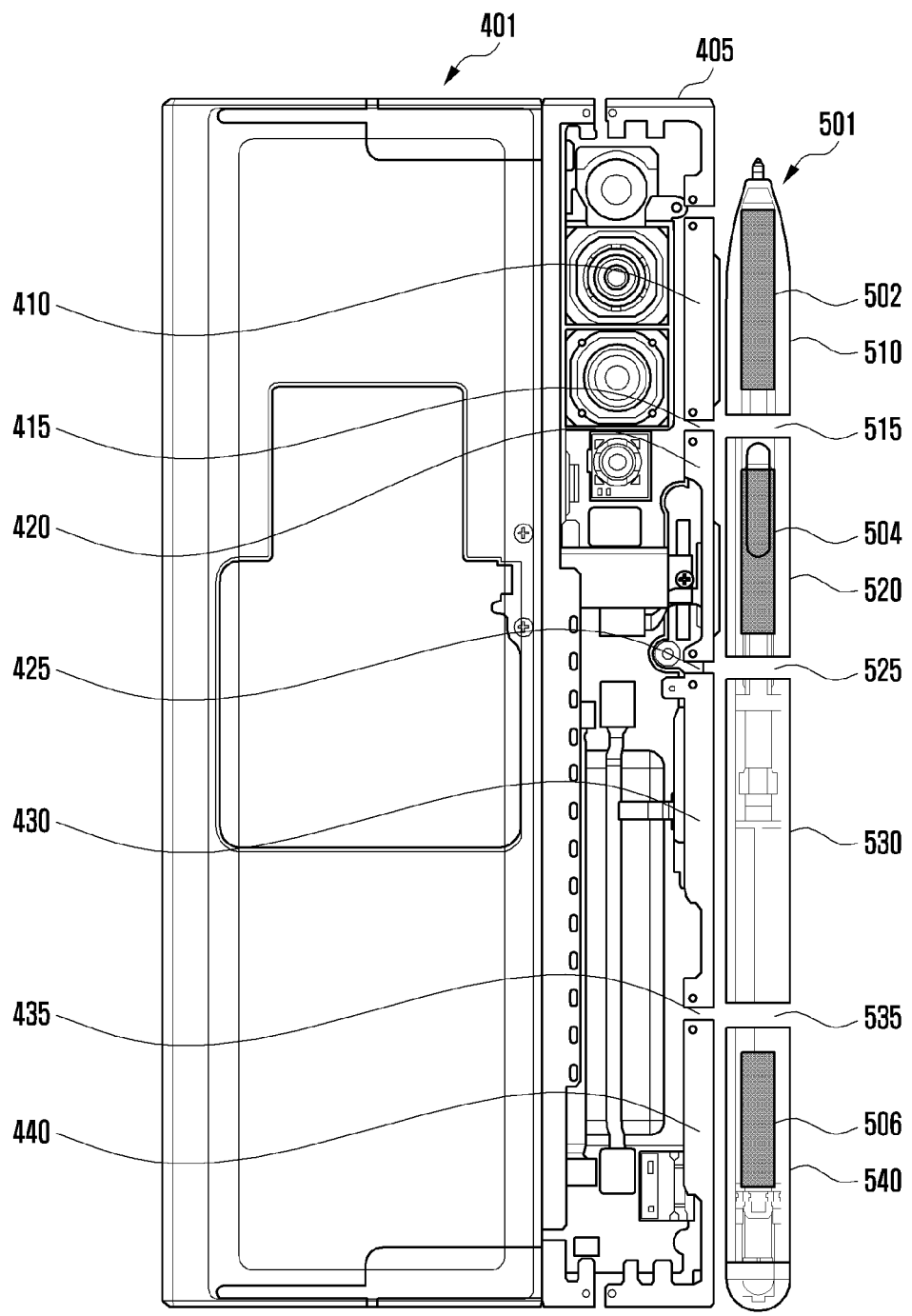
FIG. 4 is a view schematically illustrating an embodiment of configuring an electronic device and a stylus pen according to an embodiment of the disclosure.

FIG. 4 is a view schematically illustrating an embodiment of configuring an electronic device and a stylus pen according to an embodiment of the disclosure.

Referring to FIG. 4, the electronic device 401 in FIG. 4 may include the electronic device 101 in FIG. 1, the electronic device 200 in FIGS. 2A and 2B, and/or the electronic device 300 in FIG. 3.

According to various embodiments, the electronic device 401 in FIG. 4 may include a bar type electronic device, a foldable type electronic device, a rollable type electronic device, a sliding type electronic device, a wearable type electronic device, and an electronic device such as a tablet PC or a notebook PC.

With reference to FIG. 4, a stylus pen 501 may be detachably included in the electronic device 401 according to various embodiments of the disclosure.

According to an embodiment, the electronic device 401 may include a housing 405 (e.g., housing 210 in FIG. 2A or side bezel structure 310 in FIG. 3) and a printed circuit board (e.g., printed circuit board 340 in FIG. 3) disposed inside the housing 405. The housing 405 may include at least one conductive part (e.g., antenna radiator). A wireless communication module (e.g., wireless communication module 192 in FIG. 1) may be disposed on the printed circuit board 340.

According to an embodiment, one surface of the housing 405 may include at least one antenna radiator (e.g., 410, 420, 430 and/or 440) formed through at least one cut-off portion 415, 425 and/or 435. The at least one antenna radiator (e.g., 410, 420, 430 and/or 440) may be electrically or operably connected to the wireless communication module 192 to perform an antenna function. The at least one antenna radiator (e.g., 410, 420, 430 and/or 440) may include a conductive part.

According to various embodiments, one surface of the housing 405 may include a first antenna radiator 410, a second antenna radiator 420, a third antenna radiator 430, and/or a fourth antenna radiator 440. The first antenna radiator 410 may include a first conductive part. The second antenna radiator 420 may include a second conductive part. The third antenna radiator 430 may include a third conductive part. The fourth antenna radiator 440 may include a fourth conductive part. At least a portion of the housing 405 may include a conductive material (e.g., metal).

According to various embodiments, a first cut-off portion 415 may be formed between the first antenna radiator 410 and the second antenna radiator 420. A second cut-off portion 425 may be formed between the second antenna radiator 420 and the third antenna radiator 430. A third cut-off portion 435 may be formed between the third antenna radiator 430 and the fourth antenna radiator 440.

According to various embodiments, the first antenna radiator 410 and the second antenna radiator 420 may be separated through the first cut-off portion 415. The second antenna radiator 420 and the third antenna radiator 430 may be separated through the second cut-off portion 425. The third antenna radiator 430 and the fourth antenna radiator 440 may be separated through the third cut-off portion 435.

According to an embodiment, the stylus pen 501 may be attachable to and detachable from one surface of the housing 405 through at least one magnet 502, 504 and/or 506.

According to an embodiment, the stylus pen 501 may include a first body 510, a second body 520, a third body 530, and/or a fourth body 540. According to an embodiment, the stylus pen 501 may include at least one magnet. For example, the first body 510 may include a first magnet 502 therein. For example, the second body 520 may include a second magnet 504 therein. For example, the fourth body 540 may include a third magnet 506 therein. The stylus pen 501 may be attachable to and detachable from one surface of the housing 405 of the electronic device 401 by using the first magnet 502, the second magnet 504, and/or the third magnet 506.

According to various embodiments, a first cut-off portion 515 may be formed between the first body 510 and the second body 520. A second cut-off portion 525 may be formed between the second body 520 and the third body 530. A third cut-off portion 535 may be formed between the third body 530 and the fourth body 540.

According to various embodiments, the first body 510 and the second body 520 may be separated through the first cut-off portion 515. The second body 520 and the third body 530 may be separated through the second cut-off portion 525. The third body 530 and the fourth body 540 may be separated through the third cut-off portion 535.

According to various embodiments, the first cut-off portion 515, second cut-off portion 525, and third cut-off portion 535 of the stylus pen 501 may be formed at positions corresponding to the first cut-off portion 415, second cut-off portion 425, and third cut-off portion 435 of the electronic device 401.

According to various embodiments, when the stylus pen 501 is attached to the electronic device 401, the first cut-off portion 415, second cut-off portion 425, and third cut-off portion 435 of the electronic device 401 may be aligned with the first cut-off portion 515, second cut-off portion 525, and third cut-off portion 535 of the stylus pen 501.

According to various embodiments, when the stylus pen 501 is attached to the electronic device 401, the first antenna radiator 410, second antenna radiator 420, third antenna radiator 430, and fourth antenna radiator 440 of the electronic device 401 may be disposed at positions corresponding to the first body 510, second body 520, third body 530 and fourth body 540 of the stylus pen 501.

According to various embodiments, when the electronic device 401 and the stylus pen 501 are coupled, as the first cut-off portion 415, second cut-off portion 425, and third cut-off portion 435 of the electronic device 401 are aligned at positions corresponding to the first cut-off portion 515, second cut-off portion 525, and third cut-off portion 535 of the stylus pen 501, radiation performance degradation of the first antenna radiator 410, second antenna radiator 420, third antenna radiator 430, and/or fourth antenna radiator 440 operating as antennas may be reduced.

Figure 5:
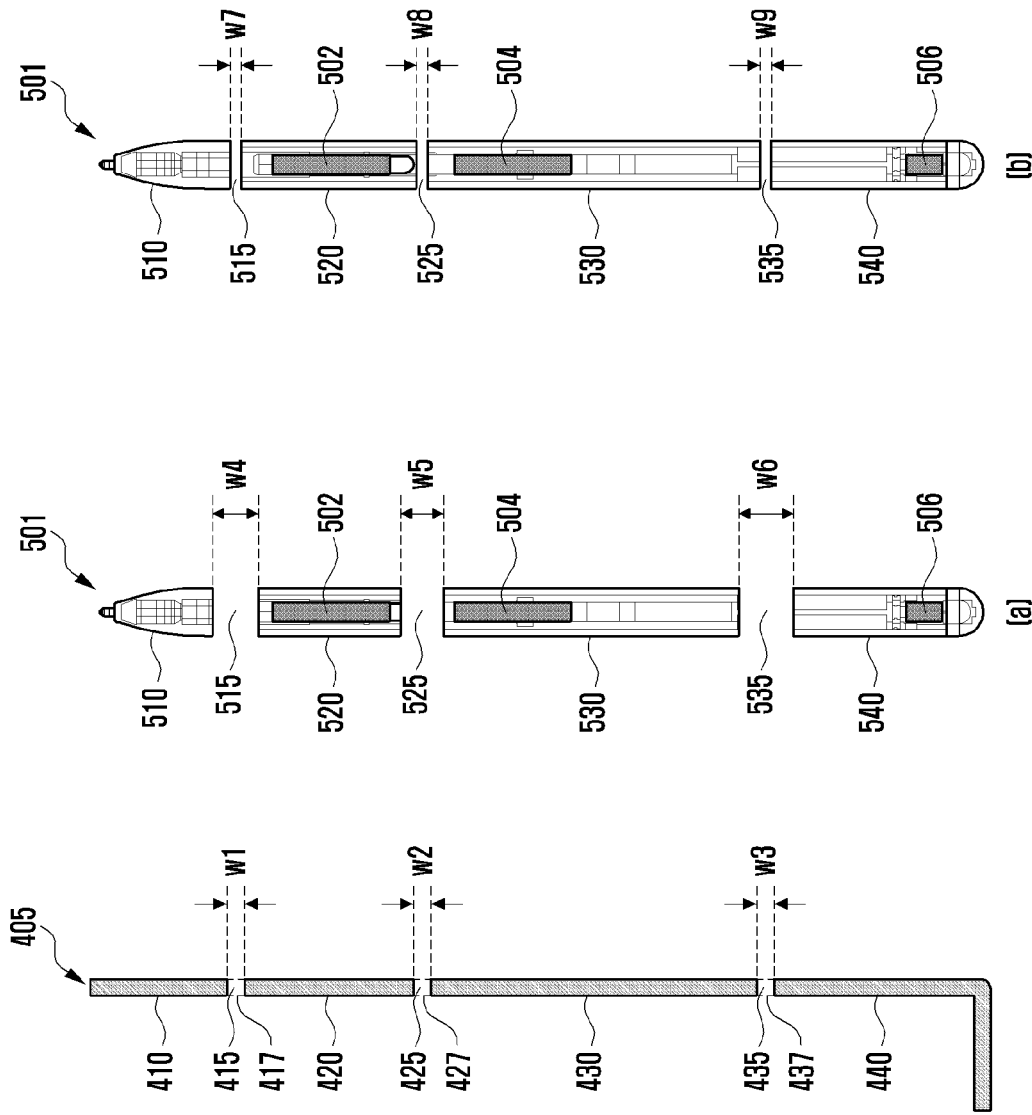
FIG. 5 is a view for comparing and explaining widths of at least one cut-off portion of an electronic device and at least one cut-off portion of a stylus pen according to an embodiment of the disclosure.

FIG. 5 is a view for comparing and explaining widths of at least one cut-off portion of the electronic device and at least one cut-off portion of the stylus pen according to an embodiment of the disclosure.

According to various embodiments, the embodiments related to FIG. 5 may include the embodiments disclosed in FIG. 4.

Referring to FIG. 5, the same reference numerals are assigned to the components substantially the same as those of the embodiment of FIG. 4, and repeated descriptions of their functions may be omitted.

Referring to FIG. 5, a first non-conductive member 417 may be filled in the first cut-off portion 415. A second non-conductive member 427 may be filled in the second cut-off portion 425. A third non-conductive member 437 may be filled in the third cut-off portion 435.

According to various embodiments, the first non-conductive member 417, the second non-conductive member 427, and the third non-conductive member 437 may prevent foreign substances from entering the electronic device 401 from the outside. The first non-conductive member 417, the second non-conductive member 427, and/or the third non-conductive member 437 may include a dielectric (e.g., insulator) material containing at least one of polycarbonate, polyimide, plastic, polymer, or ceramic.

According to various embodiments, the stylus pen 501 may not include the first magnet 502 in the first body 510. Unlike the embodiment of FIG. 4, the stylus pen 501 according to the embodiment of FIG. 5 may include the first magnet 502 in the second body 520. The second magnet 504 may be included in the third body 530. The third magnet 506 may be included in the fourth body 540.

According to various embodiments, as long as the stylus pen 501 is attachable and detachable to and from the electronic device 401, either at least one of the first magnet 502, the second magnet 504, or the third magnet 506 may be included in the stylus pen 501 or more magnets may be included. Without being limited to the number of the first magnet 502, the second magnet 504, and the third magnet 506, a smaller or larger number of magnets may be included in the stylus pen 501.

According to various embodiments, the first cut-off portion 515, second cut-off portion 525, and third cut-off portion 535 formed in the stylus pen 501 may be aligned at positions corresponding to the first cut-off portion 415, second cut-off portion 425, and third cut-off portion 435 formed in the electronic device 401.

According to various embodiments, the number of cut-off portions formed in the stylus pen 501 may be determined based on the number of cut-off portions or antenna radiators (e.g., conductive parts) formed in the housing 405.

According to an embodiment, the first cut-off portion 415 formed in the electronic device 401 may have a first width w1. The second cut-off portion 425 may have a second width w2. The third cut-off portion 435 may have a third width w3.

According to various embodiments, the first width w1, the second width w2, and the third width w3 may be substantially the same. In another embodiment, the first width w1, the second width w2, and the third width w3 may be different widths.

With reference to part (a) of FIG. 5, the first cut-off portion 515 formed in the stylus pen 501 may have a fourth width w4. The second cut-off portion 525 may have a fifth width w5. The third cut-off portion 535 may have a sixth width w6.

According to various embodiments, the fourth width w4, the fifth width w5, and the sixth width w6 formed on the stylus pen 501 may be substantially the same or different. According to an embodiment, the fourth width w4, the fifth width w5, and the sixth width w6 formed in the stylus pen 501 may be wider than the first width w1, the second width w2, and the third width w3 formed at corresponding positions of the electronic device 401.

With reference to part (b) of FIG. 5, the first cut-off portion 515 formed in the stylus pen 501 may have a seventh width w7. The second cut-off portion 525 may have an eighth width w8. The third cut-off portion 535 may have a ninth width w9.

According to various embodiments, the seventh width w7, the eighth width w8, and the ninth width w9 formed in the stylus pen 501 may be substantially the same or different. According to an embodiment, the seventh width w7, the eighth width w8, and the ninth width w9 formed in the stylus pen 501 may be narrower than the first width w1, the second width w2, and the third width w3 formed at corresponding positions of the electronic device 401.

Figure 6:
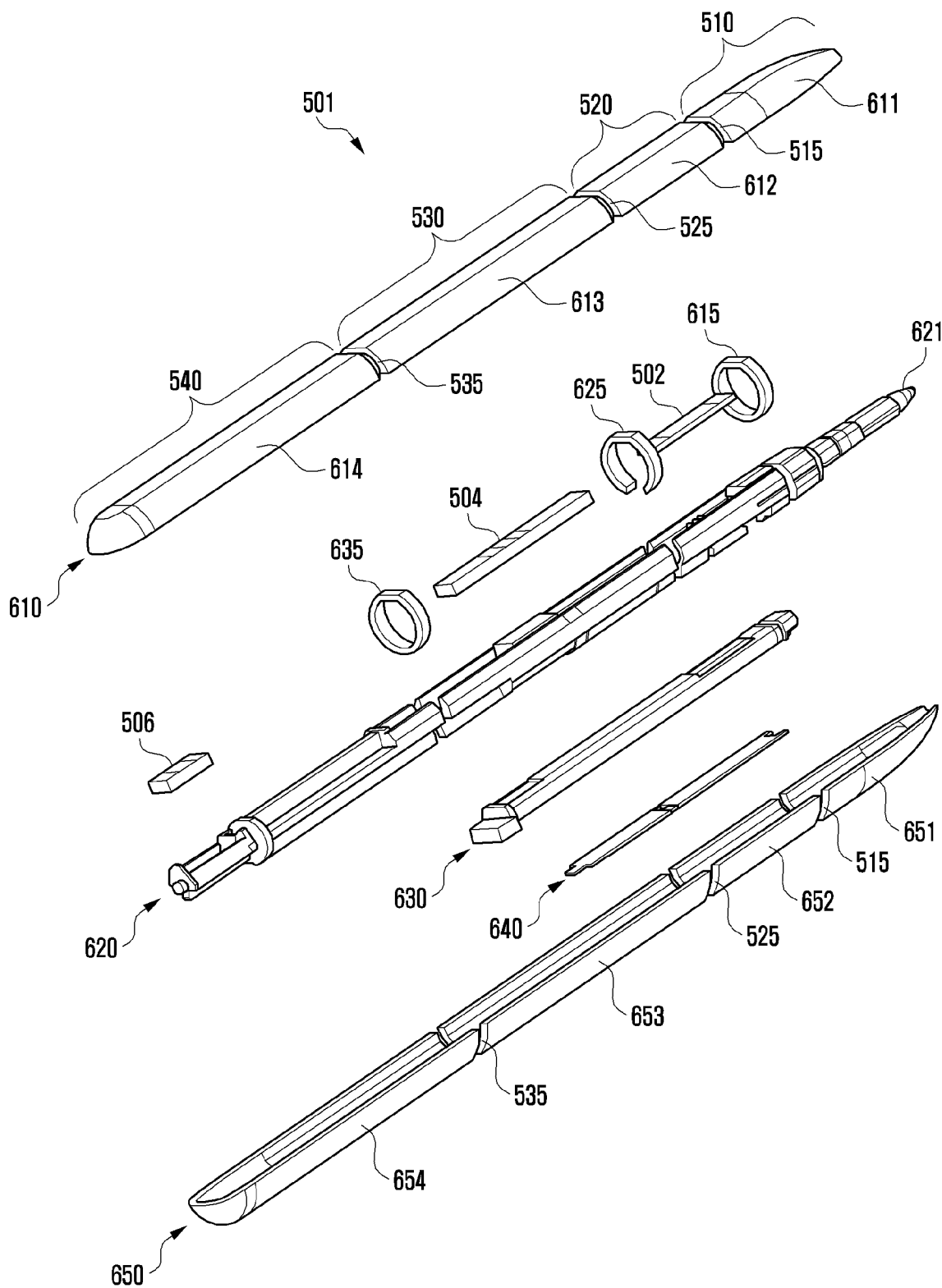
FIG. 6 is a view schematically illustrating an embodiment of configuring a stylus pen according to an embodiment of the disclosure.

FIG. 6 is a view schematically illustrating an embodiment of configuring a stylus pen according to an embodiment of the disclosure.

Referring to FIG. 6, the same reference numerals are assigned to the components substantially the same as those of the embodiments of FIGS. 4 and 5, and repeated descriptions of their functions may be omitted.

Referring to FIG. 6, the stylus pen 501 according to various embodiments of the disclosure may include a first case 610, a support part 620, an arrangement part 630, a printed circuit board 640, and/or a second case 650.

According to an embodiment, at least a portion of the first case 610 may include a conductive material (e.g., metal). The interior of the first case 610 may include a space for accommodating the support part 620, the arrangement part 630, and the printed circuit board 640. The first case 610 may be coupled to the second case 650 to constitute the external appearance of the stylus pen 501.

According to various embodiments, the first case 610 may include a first cover 611, a second cover 612, a third cover 613, and/or a fourth cover 614. A first cut-off portion 515 may be formed between the first cover 611 and the second cover 612. A second cut-off portion 525 may be formed between the second cover 612 and the third cover 613. A third cut-off portion 535 may be formed between the third cover 613 and the fourth cover 614.

According to an embodiment, at least some of the support part 620 may be disposed in the internal space of the first case 610. The support part 620 may support the at least one magnet 502, 504 and/or 506, the arrangement part 630, and the printed circuit board 640, and at least some thereof may be disposed in the internal space of the second case 650.

According to various embodiments, the support part 620 may be disposed between the first case 610 and the second case 650. The support part 620 may support the at least one magnet 502, 504 and/or 506 to be disposed in the at least one groove. The support part 620 may include, for example, a non-conductive material. According to an embodiment, when the support part 620 includes a non-conductive material, no cut-off portion (e.g., slit) may be formed in the support part 620. A pen portion 621 for entering letters or pictures on the display (e.g., display 330 in FIG. 3) may be disposed at one end of the support part 620.

According to an embodiment, the arrangement part 630 may be coupled to the support part 620.

According to an embodiment, the printed circuit board 640 may be disposed on the arrangement part 630. The printed circuit board 640 may include components (e.g., processor or memory) for driving and operating the stylus pen 501.

According to an embodiment, at least some of the second case 650 may include a conductive material (e.g., metal). The interior of the second case 650 may include a space for accommodating the support part 620, the arrangement part 630, and/or the printed circuit board 640. The second case 650 may be coupled to the first case 610 to constitute the external appearance of the stylus pen 501.

According to various embodiments, the second case 650 may include a fifth cover 651, a sixth cover 652, a seventh cover 653, and an eighth cover 654. A first cut-off portion 515 may be formed between the fifth cover 651 and the sixth cover 652. A second cut-off portion 525 may be formed between the sixth cover 652 and the seventh cover 653. A third cut-off portion 535 may be formed between the seventh cover 653 and the eighth cover 654.

According to various embodiments, the first cover 611 and the fifth cover 651 may constitute the first body 510 of the stylus pen 501. In one embodiment, a pen portion 621 may be disposed between the first cover 110 and the fifth cover 651.

According to various embodiments, the second cover 612 and the sixth cover 652 may constitute the second body 520 of the stylus pen 501. In one embodiment, the first magnet 502, at least some of the support part 620, at least some of the arrangement part 630, or at least some of the printed circuit board 640 may be arranged between the second cover 612 and the sixth cover 652.

According to various embodiments, the third cover 613 and the seventh cover 653 may constitute the third body 530 of the stylus pen 501. In one embodiment, the second magnet 504, at least some of the support part 620, and/or at least some of the arrangement part 630 may be arranged between the third cover 613 and the seventh cover 653.

According to various embodiments, the fourth cover 614 and the eighth cover 654 may constitute the fourth body 540 of the stylus pen 501. In one embodiment, the third magnet 506 and/or at least some of the support part 620 may be disposed between the fourth cover 614 and the eighth cover 654.

According to various embodiments, the first cut-off portion 515 formed between the first cover 611 and the second cover 612 and the first cut-off portion 515 formed between the fifth cover 651 and the sixth cover 652 may be the same cut-off portion. The second cut-off portion 525 formed between the second cover 612 and the third cover 613 and the second cut-off portion 525 formed between the sixth cover 652 and the seventh cover 653 may be the same cut-off portion. The third cut-off portion 535 formed between the third cover 613 and the fourth cover 614 and the third cut-off portion 535 formed between the seventh cover 653 and the eighth cover 654 may be the same cut-off portion.

According to various embodiments, a first non-conductive member 615 may be filled or disposed in the first cut-off portion 515. A second non-conductive member 625 may be filled or disposed in the second cut-off portion 525. A third non-conductive member 635 may be filled or disposed in the third cut-off portion 535. For example, the first non-conductive member 615, the second non-conductive member 625, and/or the third non-conductive member 635 may include a rubber ring. As another example, the first non-conductive member 615, the second non-conductive member 625, and/or the third non-conductive member 635 may include a dielectric (e.g., insulator) material containing at least one of polycarbonate, polyimide, plastic, polymer, or ceramic.

Figure 7:
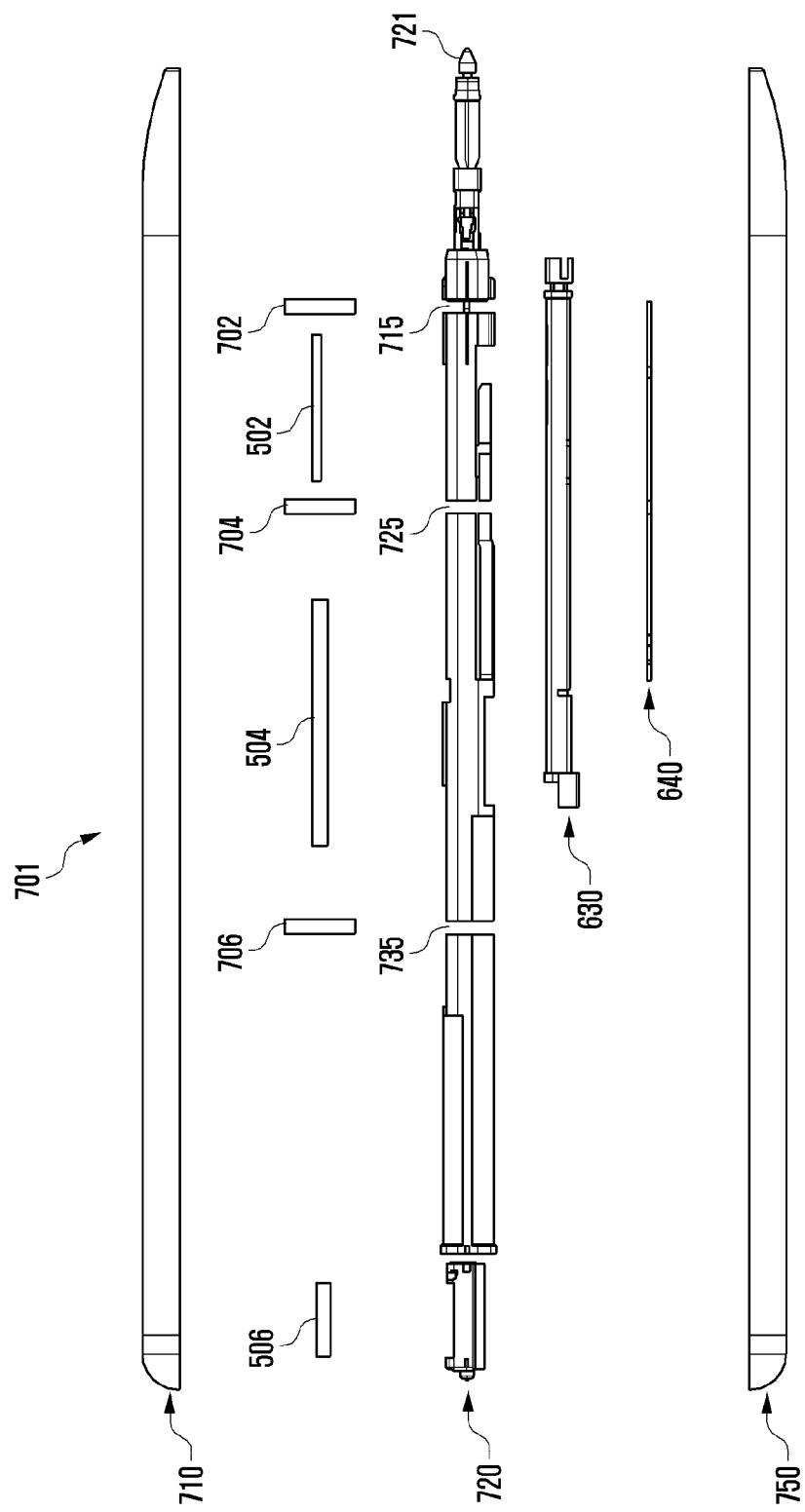
FIG. 7 is a view schematically illustrating another embodiment of configuring a stylus pen according to an embodiment of the disclosure.

FIG. 7 is a view schematically illustrating another embodiment of configuring a stylus pen according to an embodiment of the disclosure.

Referring to FIG. 7, the same reference numerals are assigned to the components substantially the same as those of the embodiments of FIGS. 4 to 6, and repeated descriptions of their functions may be omitted.

Referring to FIG. 7, the stylus pen 701 according to various embodiments of the disclosure may include a first case 710, a conductive support part 720, an arrangement part 630, a printed circuit board 640, and/or a second case 750.

According to an embodiment, the first case 710 may be made of a dielectric (e.g., insulator). The interior of the first case 710 may include a space capable of accommodating the conductive support part 720, the arrangement part 630, and/or the printed circuit board 640. The first case 710 may be coupled to the second case 750 to constitute the external appearance of the stylus pen 701.

According to various embodiments, the first case 710 and the second case 750 may be made of a non-conductive material. In one embodiment, when the first case 710 and the second case 750 are made of a non-conductive material, no cut-off portion may be formed in the first case 710 and the second case 750.

According to an embodiment, at least some of the conductive support part 720 may be disposed in the internal space of the first case 710. For example, the conductive support part 720 may support the at least one magnet 502, 504 and/or 506, the arrangement part 630, and/or the printed circuit board 640, and at least some thereof may be disposed in the internal space of the first case 710.

According to various embodiments, the conductive support part 720 may be disposed between the first case 710 and the second case 750. For example, at least one magnet 502, 504 and/or 506 may be disposed in at least one groove of the conductive support part 720 to be supported. In one embodiment, when the conductive support part 720 is made of a conductive material, at least one cut-off portion 715, 725 and/or 735 (e.g., slit) may be formed in the conductive support part 720. A pen portion 721 capable of entering letters or pictures on the display (e.g., display 330 in FIG. 3) may be disposed at one end of the conductive support part 720.

According to various embodiments, the conductive support part 720 may include a first cut-off portion 715, a second cut-off portion 725, and a third cut-off portion 735 formed at positions corresponding to the first cut-off portion 415, the second cut-off portion 425, and the third cut-off portion 435 of the electronic device 401. When the stylus pen 701 is attached to the electronic device 401, the first cut-off portion 415, second cut-off portion 425, and third cut-off portion 435 of the electronic device 401 may be aligned at positions corresponding to the first cut-off portion 715, second cut-off portion 725, and third cut-off portion 735 formed on the conductive support part 720 of the stylus pen 701.

According to various embodiments, a first non-conductive member 702 may be filled in the first cut-off portion 715 of the conductive support part 720. A second non-conductive member 704 may be filled in the second cut-off portion 725. A third non-conductive member 706 may be filled in the third cut-off portion 735. For example, the first non-conductive member 702, the second non-conductive member 704, and/or the third non-conductive member 704 may include a dielectric (e.g., insulator) material containing at least one of polycarbonate, polyimide, plastic, polymer, or ceramic.

According to various embodiments, the first magnet 502 may be disposed on the conductive support part 720 between the first cut-off portion 715 and the second cut-off portion 725. The second magnet 504 may be disposed on the conductive support part 720 between the second cut-off portion 725 and the third cut-off portion 735. The third magnet 506 may be disposed between the third cut-off portion 735 and the distal end of the conductive support portion 720.

According to an embodiment, the printed circuit board 640 may be disposed in the arrangement part 630, which may be coupled to the conductive support part 720.

According to an embodiment, the second case 750 may be made of a dielectric (e.g., insulator). The interior of the second case 750 may include a space for accommodating the conductive support part 720, the arrangement part 630, and/or the printed circuit board 640. The second case 750 may be coupled to the first case 710 to constitute the external appearance of the stylus pen 701.

Figure 8:
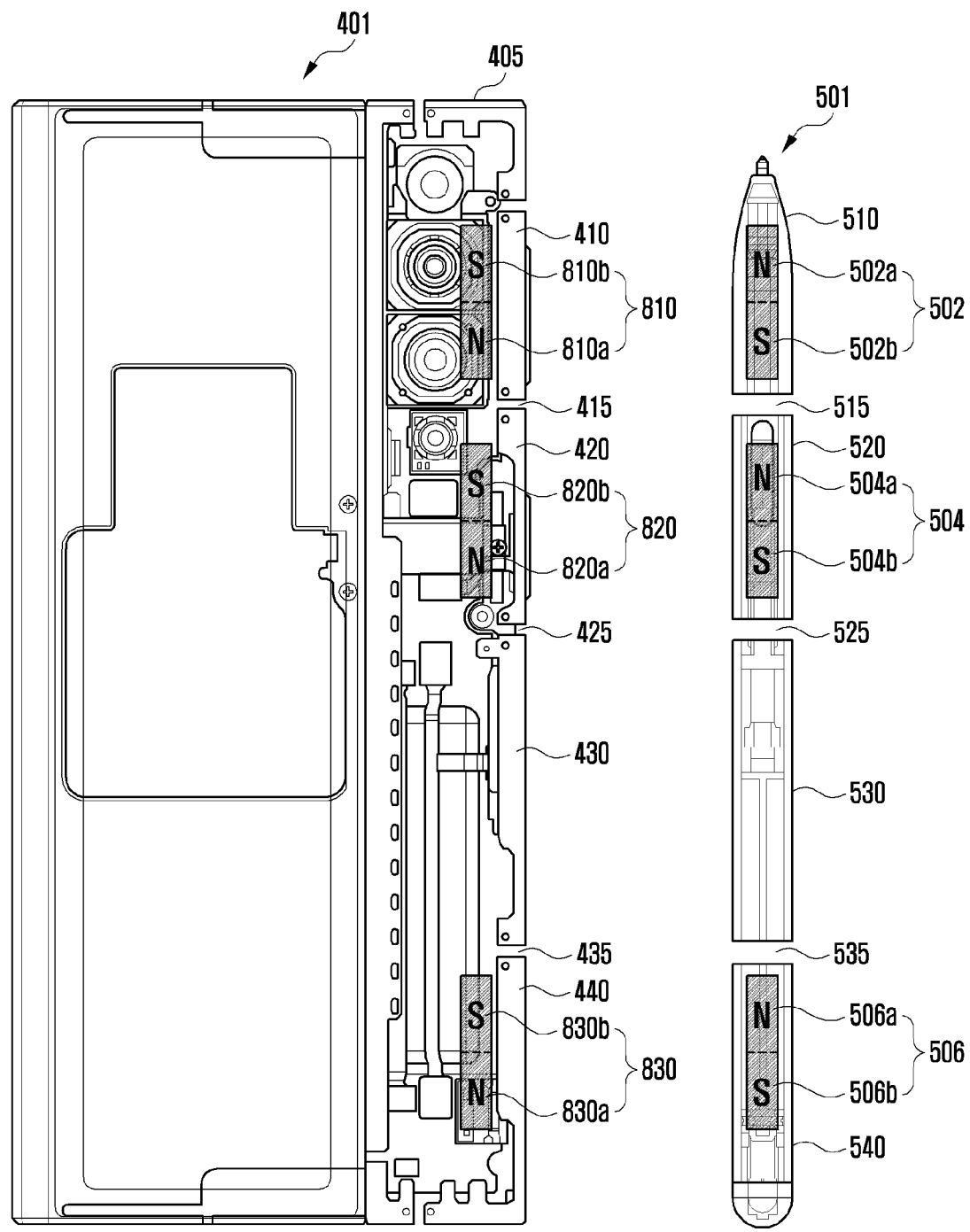
FIG. 8 is a view schematically illustrating another embodiment of configuring an electronic device and a stylus pen according to an embodiment of the disclosure.

FIG. 8 is a view schematically illustrating another embodiment of configuring an electronic device and a stylus pen according to an embodiment of the disclosure.

Referring to FIG. 8, the same reference numerals are assigned to the components substantially the same as those of the embodiments of FIGS. 4 to 7, and repeated descriptions of their functions may be omitted.

Referring to FIG. 8, the electronic device 401 according to various embodiments of the disclosure may include at least one magnet 810, 820 and/or 830. The stylus pen 501 may include at least one magnet 502, 504 and/or 506 at a position corresponding to the at least one magnet 810, 820 and/or 830 included in the electronic device 401. The at least one magnet 810, 820 and/or 830 disposed in the electronic device 401 may be detachably coupled to the at least one magnet 810, 820 and/or 830 disposed in the stylus pen 501.

According to an embodiment, one surface of the housing 405 of the electronic device 401 may include at least one antenna radiator (e.g., 410, 420, 430 and/or 440) formed through the at least one cut-off portion 415, 425 and/or 435.

According to various embodiments, one surface of the housing 405 of the electronic device 401 may include a first antenna radiator 410, a second antenna radiator 420, a third antenna radiator 430, and/or a fourth antenna radiator 440. At least some of the housing 405 may include a conductive material (e.g., metal).

According to various embodiments, a first cut-off portion 415 may be formed between the first antenna radiator 410 and the second antenna radiator 420. A second cut-off portion 425 may be formed between the second antenna radiator 420 and the third antenna radiator 430. A third cut-off portion 435 may be formed between the third antenna radiator 430 and the fourth antenna radiator 440.

According to an embodiment, the first magnet 810 may be disposed on the inward side of the first antenna radiator 410. The first magnet 810 may have an S pole 810b and an N pole 810a.

According to an embodiment, the second magnet 820 may be disposed on the inward side of the second antenna radiator 420. The second magnet 820 may have an S pole 820b and an N pole 820a.

According to an embodiment, the third magnet 830 may be disposed on the inward side of the fourth antenna radiator 440. The third magnet 830 may include an S pole 830b and an N pole 830a.

According to an embodiment, the stylus pen 501 is attachable to and detachable from one surface of the housing 405 through the at least one magnet 502, 504 and/or 506.

According to various embodiments, the stylus pen 501 may include a first body 510, a second body 520, a third body 530, and/or a fourth body 540.

According to various embodiments, the first cut-off portion 515 may be formed between the first body 510 and the second body 520. The second cut-off portion 525 may be formed between the second body 520 and the third body 530. The third cut-off portion 535 may be formed between the third body 530 and the fourth body 540.

According to an embodiment, the first body 510 may internally include a first magnet 502. The first magnet 502 may have an N pole 502a and an S pole 502b.

According to an embodiment, the second body 520 may internally include a second magnet 504. The second magnet 504 may have an N pole 504a and an S pole 504b.

According to an embodiment, the fourth body 540 may internally include a third magnet 506. The third magnet 506 may have an N pole 506a and an S pole 506b.

According to various embodiments, when the electronic device 401 and the stylus pen 501 are combined, the first magnet 810, second magnet 820, and third magnet 830 of the electronic device 401 may be detachably coupled respectively to the first magnet 502, second magnet 504, and third magnet 506 of the stylus pen 501.

According to various embodiments, the S pole 810b and the N pole 810a of the first magnet 810 of the electronic device 401 may be disposed to have the opposite polarities of the N pole 502a and the S pole 502b of the corresponding first magnet 502 of the stylus pen 501. The S pole 820b and the N pole 820a of the second magnet 820 of the electronic device 401 may be disposed to have the opposite polarities of the N pole 504a and the S pole 504b of the corresponding second magnet 504 of the stylus pen 501. The S pole 830b and the N pole 830a of the third magnet 830 of the electronic device 401 may be disposed to have the opposite polarities of the N pole 506a and the S pole 506b of the corresponding third magnet 506 of the stylus pen 501.

According to various embodiments, when the stylus pen 501 is attached to the electronic device 401, the first cut-off portion 415, second cut-off portion 425, and third cut-off portion 435 of the electronic device 401 may be arranged to be aligned respectively with the first cut-off portion 515, second cut-off portion 525, and third cut-off portion 535 of the stylus pen 501.

Figure 9:
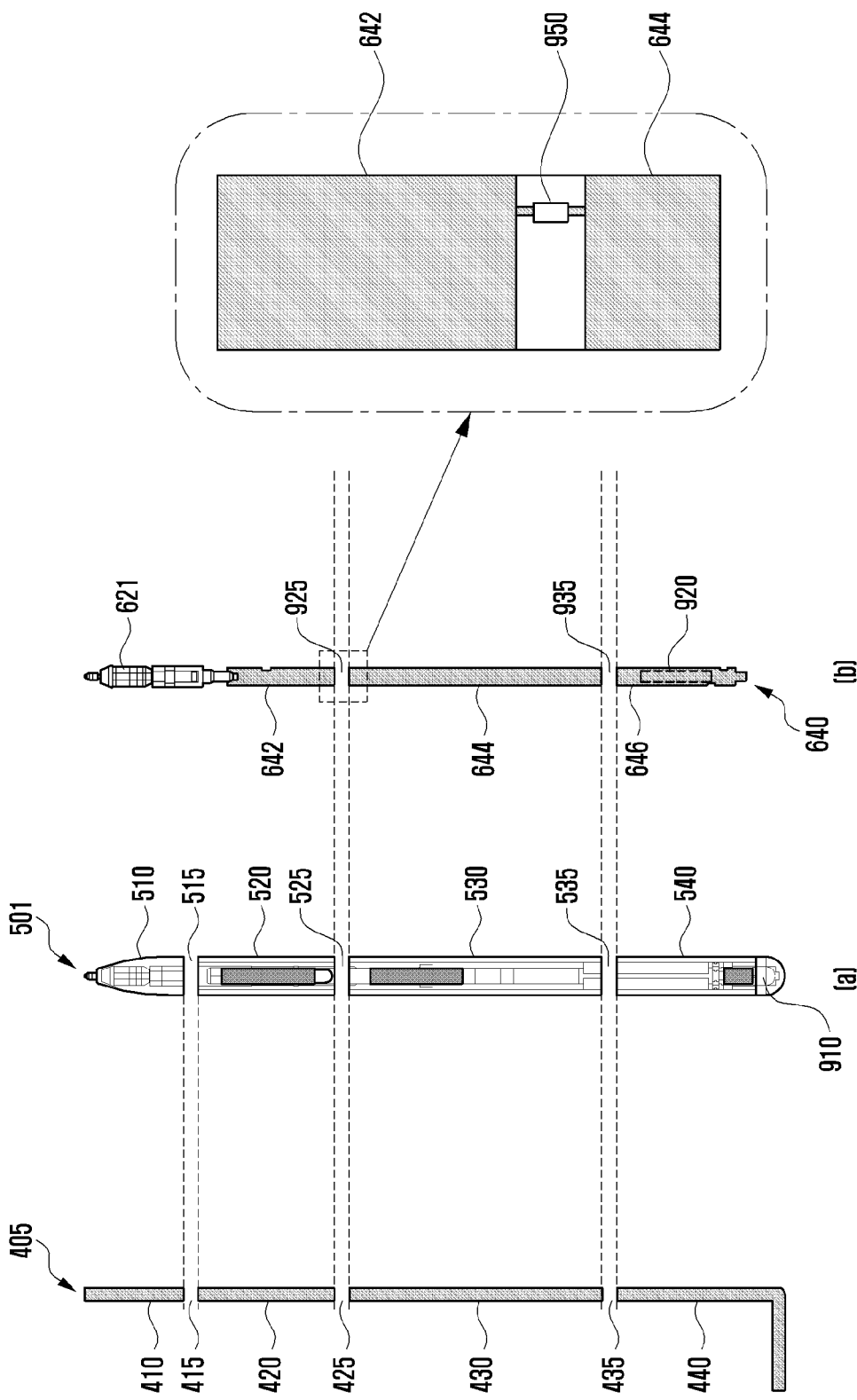
FIG. 9 is a view schematically illustrating a configuration of cut-off portions formed on a printed circuit board of a stylus pen according to an embodiment of the disclosure.

FIG. 9 is a view schematically illustrating a configuration of cut-off portions formed on the printed circuit board of the stylus pen according to an embodiment of the disclosure.

Referring to FIG. 9, the same reference numerals are assigned to the components substantially the same as those of the embodiments of FIGS. 4 to 8, and repeated descriptions of their functions may be omitted.

Referring to part (a) of FIG. 9, the stylus pen 501 may include an antenna 910 in the fourth body 540. The stylus pen 501 may transmit and receive a radio signal with low power to and from the electronic device 401 through the antenna 910. For example, the antenna 910 may be an antenna for Bluetooth low energy (BLE) communication.

Referring to part (b) of FIG. 9, the printed circuit board 640 of the stylus pen 501 may include a first PCB 642, a second PCB 644, and/or a third PCB 646.

According to an embodiment, a first cut-off portion 925 may be formed between the first PCB 642 and the second PCB 644. The first PCB 642 and the second PCB 644 may be separated through the first cut-off portion 925. In one embodiment, the first PCB 642 and the second PCB 644 may be connected through an inductor element 950 disposed at the first cut-off portion 925. The printed circuit board 640 may be grounded by using the inductor element 950.

According to various embodiments, the inductor element 950 may be connected in a direct current (DC) manner between the first PCB 642 and the second PCB 644 so that the ground of the first PCB 642 and the ground of the second PCB 644 block a radio signal. The inductor element 950 may also be connected between the first PCB 642 and the second PCB 644 by using signal lines.

According to an embodiment, a second cut-off portion 935 may be formed between the second PCB 644 and the third PCB 646. In one embodiment, the third PCB 646 may include an integrated circuit (IC) chip 920 (e.g., processor) operably connected to the antenna 910.

According to various embodiments, the printed circuit board 640 may be disposed inside the stylus pen 501. For example, the first PCB 642 and the pen portion 621 may be disposed inside the first body 510 and the second body 520. As another example, the second PCB 644 may be disposed inside the third body 530. As another example, the third PCB 646 may be disposed inside the fourth body 540.

According to various embodiments, the first cut-off portion 925 formed between the first PCB 642 and the second PCB 644 may be formed at a position corresponding to the second cut-off portion 425 of the electronic device 401. The second cut-off portion 935 formed between the second PCB 644 and the third PCB 646 may be formed at a position corresponding to the third cut-off portion 435 of the electronic device 401.

Figure 10:
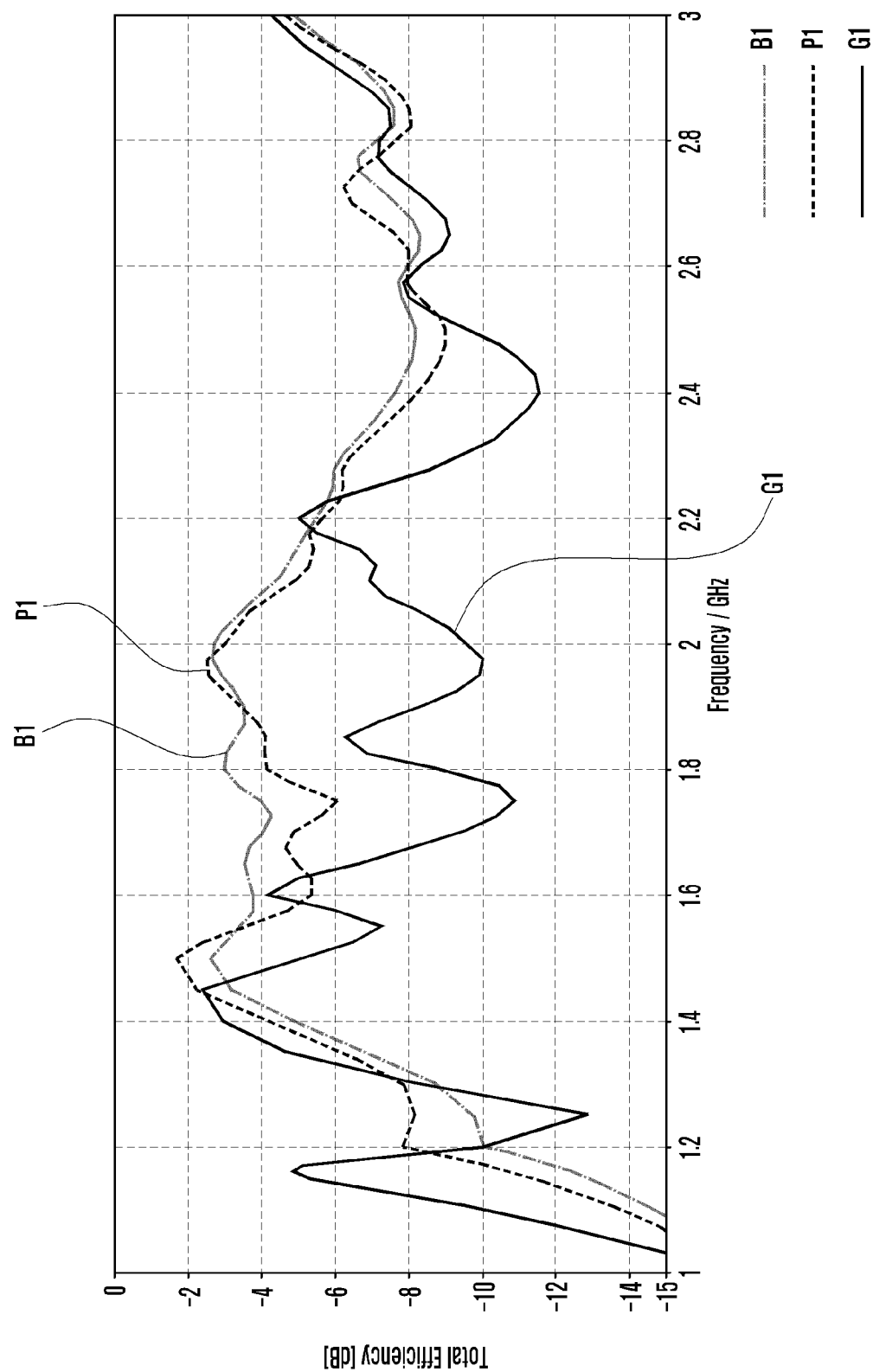
FIG. 10 is a diagram comparing radiation efficiencies of an electronic device according to a first comparative embodiment, a second comparative embodiment, and various embodiments of the disclosure.

FIG. 10 is a diagram comparing radiation efficiencies of an electronic device according to a first comparative embodiment, a second comparative embodiment, and various embodiments of the disclosure.

According to various embodiments, the first comparative embodiment may represent the radiation efficiency when a stylus pen is not attached to the electronic device. The graph regarding the radiation efficiency of the electronic device according to the first comparative embodiment may be indicated by B1.

According to various embodiments, the second comparative embodiment may represent the radiation efficiency when a stylus pen in which no cut-off portion is formed is attached to the electronic device. The graph regarding the radiation efficiency of the electronic device according to the second comparative embodiment may be indicated by G1.

The electronic device 401 according to various embodiments of the disclosure may be in a state where the stylus pen 501 in which at least one cut-off portion 515, 525 and/or 535 is formed is detachably attached. The graph regarding the radiation efficiency when the stylus pen 501 having at least one cut-off portion 515, 525 and/or 535 is coupled to the electronic device 401 may be indicated by P1.

Referring to FIG. 10, when the stylus pen is not coupled to the electronic device, the electronic device may exhibit basic radiation efficiency as shown in graph G1. On the other hand, it can be seen that when the stylus pen in which no cut-off portion is formed is coupled to the electronic device, the radiation efficiency is reduced to about −10 dB in a frequency range between about 1.9 GHz and about 2 GHz.

On the other hand, as in various embodiments of the disclosure, it can be seen that when the stylus pen 501, in which at least one cut-off portion 515, 525 and/or 535 is formed at a position corresponding to at least one cut-off portion 415, 425 and/or 435 formed on at least one surface of the housing 405 of the electronic device 401, is detachably attached, the radiation efficiency is improved to about −3 dB in the frequency range between about 1.9 GHz and about 2 GHz. For example, in the electronic device 401 according to various embodiments of the disclosure, the radiation efficiency may be improved by about 6 dB to about 7 dB compared to the second comparative embodiment.

Figure 11:
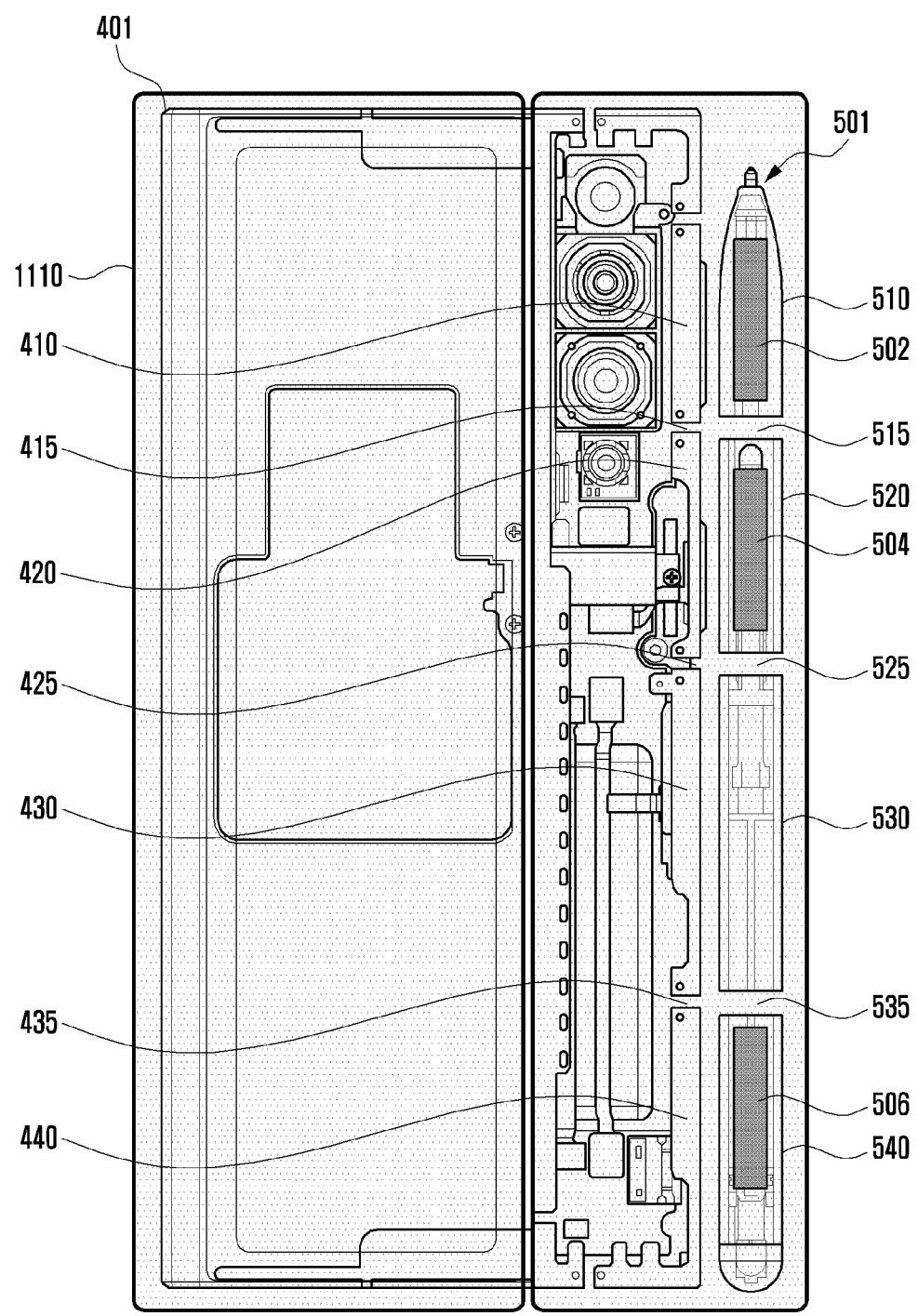
FIG. 11 is a view schematically illustrating a state in which an electronic device and a stylus pen are combined in a cover according to an embodiment of the disclosure.

FIG. 11 is a view schematically illustrating a state in which an electronic device and a stylus pen are combined in a cover according to an embodiment of the disclosure.

Referring to FIG. 11, the at least one cut-off portion 415, 425 and/or 435 of the electronic device 401 may be aligned at a position corresponding to the at least one cut-off portion 515, 525 and/or 535 of the stylus pen 501, and be disposed in a cover 1110 (e.g., book cover). For example, the cover 1110 may include an accessory attachable to and detachable from the electronic device 401 such as a book cover or a protective case.

According to various embodiments, the electronic device 401 and the stylus pen 501 may be coupled at a designated position within the cover 1110. For example, the cover 1110 may include at least one magnet (not shown) on an inner side surface. The electronic device 401 and the stylus pen 501 may be disposed at a designated position through at least one magnet disposed within the cover 1110. The at least one magnet within the cover 1110 may be detachably disposed with the at least one magnet 502, 504 and/or 506 within the stylus pen 501. According to various embodiments, the at least one magnet within the cover 1110 may be disposed at a designated position so that the at least one cut-off portion 415, 425 and/or 435 of the electronic device 401 and the at least one cut-off portion 515, 525 and/or 535 of the stylus pen 501 are aligned in corresponding positions. The at least one magnet within the cover 1110 may be at least partially arranged on the center, right side, or left side of the cover 110.

An electronic device 401 according to various embodiments of the disclosure may include: a housing 405 including a conductive part (e.g., antenna radiator 410, 420, 430 and/or 440) and at least one cut-off portion 415, 425 and/or 435 formed in the conductive part; a printed circuit board (e.g., printed circuit board 340 in FIG. 3) disposed inside the housing; a wireless communication module (e.g., wireless communication module 192 in FIG. 1) disposed on the printed circuit board; and a stylus pen 501, wherein the conductive part may be electrically connected to the wireless communication module, wherein the stylus pen may include at least one cut-off portion 515, 525 and/or 535, and at least one magnet 502, 504 and/or 506 enabling attachment and detachment to and from the housing, and wherein when the stylus pen is attached to the housing, the at least one cut-off portion 415, 425 and/or 435 formed in the conductive part may be aligned with the at least one cut-off portion 515, 525 and/or 535 formed in the stylus pen.

According to various embodiments, the conductive part may include a first radiator 410, a second radiator 420, a third antenna radiator 430, and/or a fourth radiator 440.

According to various embodiments, the stylus pen 501 may include a first body 510, a second body 520, a third body 530, and/or a fourth body 540.

According to various embodiments, the at least one cut-off portion 515, 525 and/or 535 formed in the stylus pen 501 may be formed at least one of between the first body and the second body, between the second body and the third body, or between the third body and the fourth body.

According to various embodiments, the at least one cut-off portion 415, 425 and/or 435 formed in the conductive part may be formed at least one of between the first radiator 410 and the second radiator 420, between the second radiator 420 and the third antenna radiator 430, or between the third antenna radiator 430 and the fourth radiator 440.

According to various embodiments, a non-conductive member 615, 625 and/or 635 may be filled in the at least one cut-off portion 515, 525 and/or 535 formed in the stylus pen 501, and a non-conductive member 417, 427 and/or 437 may be filled in the at least one cut-off portion 415, 425 and/or 435 formed in the conductive part.

According to various embodiments, the at least one magnet 502, 504 and/or 506 included in the stylus pen 501 may be disposed inside the first body, the second body, the third body, and/or the fourth body.

According to various embodiments, the width of the at least one cut-off portion 415, 425 and/or 435 formed in the conductive part may be wider or narrower than the width of the at least one cut-off portion 515, 525 and/or 535 formed in the stylus pen 501.

According to various embodiments, the stylus pen 501 or 701 may internally include a conductive support part 720, and the conductive support part may include at least one cut-off portion 715, 725 and/or 735 formed at a position corresponding to the at least one cut-off portion 415, 425 and/or 435 formed in the conductive part.

According to various embodiments, the stylus pen 501 or 701 may internally include a printed circuit board 640, the printed circuit board may include at least one cut-off portion formed at a position corresponding to the at least one cut-off portion 415, 425 and/or 435 formed in the conductive part, and an inductor element 950 may be disposed in the at least one cut-off portion formed on the printed circuit board.

An electronic device 401 including a stylus pen 501 or 701 according to various embodiments of the disclosure may include: a housing 405 including a conductive part (e.g., third antenna radiator 410, 420, 430 and/or 440) and at least one cut-off portion 415, 425 and/or 435 formed in the conductive part; a printed circuit board (e.g., printed circuit board 340 in FIG. 3) disposed inside the housing; a wireless communication module (e.g., wireless communication module 192 in FIG. 1) disposed on the printed circuit board and electrically connected to the conductive part; and at least one magnet 810, 820 and/or 830 disposed on the inward side of the conductive part, wherein the stylus pen 501 or 701 may include: at least one magnet 502, 504 and/or 506 attachable and detachable to and from the at least one magnet 810, 820 and/or 830 disposed on the inward side of the conductive part; and at least one cut-off portion 515, 525 and/or 535 formed at a position corresponding to the at least one cut-off portion 415, 425 and/or 435 formed in the conductive part, and wherein when the electronic device 401 and the stylus pen 501 are attached, the at least one cut-off portion 415, 425 and/or 435 formed in the conductive part and the at least one cut-off portion 515, 525 and/or 535 formed in the stylus pen may be aligned.

According to various embodiments, the at least one magnet 810, 820 and/or 830 disposed on the inward side of the conductive part includes an S pole and an N pole; the at least one magnet 502, 504 and/or 506 disposed in the stylus pen includes an N pole and an S pole; and when the electronic device 401 and the stylus pen 501 are attached, the S pole and the N pole of the at least one magnet disposed on the inward side of the conductive part may be detachably coupled to the N pole and the S pole of the at least one magnet disposed in the stylus pen.

According to various embodiments, the conductive part may include a first radiator 410, a second radiator 420, a third antenna radiator 430, and/or a fourth radiator 440, and the stylus pen 501 may include a first body 510, a second body 520, a third body 530, and/or a fourth body 540.

According to various embodiments, the at least one cut-off portion 515, 525 and/or 535 formed in the stylus pen 501 may be formed at least one of between the first body and the second body, between the second body and the third body, or between the third body and the fourth body.

According to various embodiments, the at least one cut-off portion 415, 425 and/or 435 formed in the conductive part may be formed at least one of between the first radiator 410 and the second radiator 420, between the second radiator 420 and the third antenna radiator 430, or between the third antenna radiator 430 and the fourth radiator 440.

According to various embodiments, a non-conductive member 615, 625 and/or 635 may be filled in the at least one cut-off portion 515, 525 and/or 535 formed in the stylus pen 501, and a non-conductive member 417, 427 and/or 437 may be filled in the at least one cut-off portion 415, 425 and/or 435 formed in the conductive part.

According to various embodiments, the at least one magnet 502, 504 and/or 506 included in the stylus pen 501 may be disposed inside the first body, the second body, the third body, and/or the fourth body.

According to various embodiments, the width of the at least one cut-off portion 415, 425 and/or 435 formed in the conductive part may be wider or narrower than the width of the at least one cut-off portion 515, 525 and/or 535 formed in the stylus pen.

According to various embodiments, the stylus pen 701 may internally include a conductive support part 720, and the conductive support part may include at least one cut-off portion 715, 725 and/or 735 formed at a position corresponding to the at least one cut-off portion 415, 425 and/or 435 formed in the conductive part.

According to various embodiments, the stylus pen may internally include a printed circuit board 640, the printed circuit board may include at least one cut-off portion formed at a position corresponding to the at least one cut-off portion 415, 425 and/or 435 formed in the conductive part, and an inductor element 950 may be disposed in the at least one cut-off portion formed on the printed circuit board.

A stylus pen 501 or 701 according to various embodiments of the disclosure may include: a first body 510, a second body 520, a third body 530, and/or a fourth body 540; at least one cut-off portion 515, 525 and/or 535 formed between the first body and the second body, between the second body and the third body, or between the third body and the fourth body; a non-conductive member 615, 625 and/or 635 filled in the at least one cut-off portion 515, 525 and/or 535; and at least one magnet 502, 504 and/or 506 disposed inside the first body, the second body, the third body, and/or the fourth body.

According to various embodiments, the stylus pen 501 or 701 may further include internally a conductive support part 720, and the conductive support part may include at least one cut-off portion 715, 725 and/or 735 formed at a position corresponding to the at least one cut-off portion 515, 525 and/or 535.

According to various embodiments, the stylus pen 501 or 701 may further include internally a printed circuit board 640, and the printed circuit board may include at least one cut-off portion 925, 935 formed at a position corresponding to the at least one cut-off portion 515, 525 and/or 535.

According to various embodiments, an inductor element 950 may be disposed in the at least one cut-off portion formed on the printed circuit board.

According to various embodiments, when the stylus pen 501 or 701 is attached to an electronic device 401 including at least one cut-off portion 415, 425 and/or 435 by using the at least one magnet 502, 504 and/or 506, the at least one cut-off portion 515, 525 and/or 535 formed in the stylus pen 501 or 701 and the at least one cut-off portion 415, 425 and/or 435 included in the electronic device 401 may be aligned.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device comprising:
a housing comprising a conductive part and at least one cut-off portion formed in the conductive part;
a printed circuit board disposed inside the housing;
a wireless communication interface disposed on the printed circuit board; and
a stylus pen,
wherein the conductive part is electrically connected to the wireless communication interface,
wherein the stylus pen comprises at least one cut-off portion, and at least one magnet enabling attachment and detachment to and from the housing, and
wherein, when the stylus pen is attached to the housing, the at least one cut-off portion formed in the conductive part and the at least one cut-off portion formed in the stylus pen are aligned.

2. The electronic device of claim 1, wherein the conductive part comprises at least one of a first radiator, a second radiator, a third radiator, or a fourth radiator.

3. The electronic device of claim 2, wherein the stylus pen comprises at least one of a first body, a second body, a third body, or a fourth body.

4. The electronic device of claim 3, wherein the at least one cut-off portion formed in the stylus pen is formed at least one of between the first body and the second body, between the second body and the third body, or between the third body and the fourth body.

5. The electronic device of claim 2, wherein the at least one cut-off portion formed in the conductive part is formed at least one of between the first radiator and the second radiator, between the second radiator and the third radiator, or between the third radiator and the fourth radiator.

6. The electronic device of claim 4,
wherein a non-conductive member is filled in the at least one cut-off portion formed in the stylus pen, and
wherein a non-conductive member is filled in the at least one cut-off portion formed in the conductive part.

7. The electronic device of claim 3, wherein the at least one magnet is disposed inside one of the first body, the second body, the third body, or the fourth body.

8. The electronic device of claim 1, wherein a width of the at least one cut-off portion formed in the conductive part is wider or narrower than that of the at least one cut-off portion formed in the stylus pen.

9. The electronic device of claim 1,
wherein the stylus pen internally comprises a conductive support part, and
wherein the conductive support part comprises at least one cut-off portion formed at a position corresponding to the at least one cut-off portion formed in the conductive part.

10. The electronic device of claim 1,
wherein the stylus pen internally comprises a printed circuit board,
wherein the printed circuit board comprises at least one cut-off portion formed at a position corresponding to the at least one cut-off portion formed in the conductive part, and
wherein an inductor element is disposed in the at least one cut-off portion formed on the printed circuit board.

11. An electronic device including a stylus pen, comprising:
a housing comprising a conductive part and at least one cut-off portion formed in the conductive part;
a printed circuit board disposed inside the housing;
a wireless communication interface disposed on the printed circuit board and electrically connected to the conductive part; and
at least one magnet disposed on an inward side of the conductive part,
wherein the stylus pen comprises:
at least one magnet attachable and detachable to and from the at least one magnet disposed on the inward side of the conductive part, and
at least one cut-off portion formed at a position corresponding to the at least one cut-off portion formed in the conductive part,
wherein when the electronic device and the stylus pen are attached, the at least one cut-off portion formed in the conductive part and the at least one cut-off portion formed in the stylus pen are aligned.

12. The electronic device of claim 11,
wherein the at least one magnet disposed on the inward side of the conductive part comprises an S pole and an N pole,
wherein the at least one magnet disposed in the stylus pen comprises an N pole and an S pole, and
wherein, when the electronic device and the stylus pen are attached, the S pole and the N pole of the at least one magnet disposed on the inward side of the conductive part are detachably coupled to the N pole and the S pole of the at least one magnet disposed in the stylus pen.

13. The electronic device of claim 11,
wherein the conductive part comprises a first radiator, a second radiator, a third radiator, and/or a fourth radiator, and
wherein the stylus pen comprises a first body, a second body, a third body, and/or a fourth body.

14. The electronic device of claim 13, wherein the at least one cut-off portion formed in the stylus pen is formed at least one of between the first body and the second body, between the second body and the third body, or between the third body and the fourth body.

15. The electronic device of claim 13, wherein the at least one cut-off portion formed in the conductive part is formed at least one of between the first radiator and the second radiator, between the second radiator and the third radiator, or between the third radiator and the fourth radiator.

16. The electronic device of claim 14,
wherein a non-conductive member is filled in the at least one cut-off portion formed in the stylus pen, and
wherein a non-conductive member is filled in the at least one cut-off portion formed in the conductive part.

17. The electronic device of claim 13, wherein the at least one magnet included in the stylus pen is disposed inside the first body, the second body, the third body, and/or the fourth body.

18. The electronic device of claim 11, wherein a width of the at least one cut-off portion formed in the conductive part is wider or narrower than that of the at least one cut-off portion formed in the stylus pen.

19. The electronic device of claim 11,
wherein the stylus pen internally comprises a conductive support part, and
wherein the conductive support part comprises at least one cut-off portion formed at a position corresponding to the at least one cut-off portion formed in the conductive part.

20. The electronic device of claim 11,
wherein the stylus pen internally comprises a printed circuit board,
wherein the printed circuit board comprises at least one cut-off portion formed at a position corresponding to the at least one cut-off portion formed in the conductive part, and
wherein an inductor element is disposed in the at least one cut-off portion formed on the printed circuit board.

* * * * *